United States Patent
Vick et al.

(10) Patent No.: US 9,304,748 B2
(45) Date of Patent: Apr. 5, 2016

(54) METHOD FOR CONTROLLING INLINING IN A CODE GENERATOR

(71) Applicant: QUALCOMM Incorporated, San Diego, CA (US)

(72) Inventors: Christopher A. Vick, San Jose, CA (US); Andres Valencia, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 14/014,571

(22) Filed: Aug. 30, 2013

(65) Prior Publication Data

US 2015/0046912 A1 Feb. 12, 2015

Related U.S. Application Data

(60) Provisional application No. 61/863,341, filed on Aug. 7, 2013.

(51) Int. Cl.
| | |
|---|---|
| *G06F 9/45* | (2006.01) |
| *G06F 9/455* | (2006.01) |
| *G06F 11/34* | (2006.01) |

(52) U.S. Cl.
CPC .............. *G06F 8/443* (2013.01); *G06F 8/4443* (2013.01); *G06F 9/45516* (2013.01); *G06F 9/45504* (2013.01); *G06F 11/3466* (2013.01)

(58) Field of Classification Search
CPC ......... G06F 8/443; G06F 8/445; G06F 8/447; G06F 11/3466; G06F 9/45504; G06F 9/45516
See application file for complete search history.

(56) References Cited

U.S. PATENT DOCUMENTS

| | | |
|---|---|---|
| 5,740,443 A | 4/1998 | Carini |
| 6,195,793 B1 | 2/2001 | Schmidt |
| 6,983,459 B1 | 1/2006 | Prosser et al. |
| 6,986,130 B1 | 1/2006 | Boucher |
| 7,386,686 B2 * | 6/2008 | Wu et al. ........................ 711/147 |
| 8,423,980 B1 * | 4/2013 | Ramasamy et al. .......... 717/140 |

(Continued)

OTHER PUBLICATIONS

Alpern et al., "Some New Approaches to Partial Inlining", 2012 ACM, VMIL'12, Oct. 21, 2012, pp. 39-47; <http://dl.acm.org/results.cfm?query=inline+throttling&Go.x=0&Go.y=0>.*

(Continued)

*Primary Examiner* — Thuy Dao
*Assistant Examiner* — Ben C Wang
(74) *Attorney, Agent, or Firm* — The Marbury Law Group, PLLC

(57) ABSTRACT

The various aspects leverage the novel observation that the number of call sites in code is directly correlated with the code's compile time and provide methods implemented by a compiler operating on a computing device (e.g., a smartphone) for performing inline throttling based on a projected number of call sites in the code that would exist after performing inline expansion. The various aspects enable the compiler to improve the performance of the generated code by aggressive inlining while carefully managing increases in compile time, thereby decreasing the power required to compile the code while increasing performance of the computing device. Thus, by inlining enough call sites to reduce the costs of handling calls while accounting for the costs of inlining, the various aspects provide for an effective balance of short compile times and effective code performance.

40 Claims, 7 Drawing Sheets

(56) References Cited

U.S. PATENT DOCUMENTS

| | | | |
|---|---|---|---|
| 8,789,032 B1* | 7/2014 | Li et al. | 717/154 |
| 9,009,691 B1* | 4/2015 | Chen et al. | 717/151 |
| 2004/0040029 A1* | 2/2004 | Debbabi et al. | 719/315 |
| 2005/0071834 A1* | 3/2005 | Gates et al. | 717/153 |
| 2005/0097528 A1 | 5/2005 | Chakrabarti et al. | |
| 2005/0097533 A1* | 5/2005 | Chakrabarti et al. | 717/144 |
| 2006/0190934 A1* | 8/2006 | Kielstra et al. | 717/148 |
| 2007/0033578 A1* | 2/2007 | Arnold et al. | 717/130 |
| 2011/0321059 A1 | 12/2011 | Yildiz et al. | |
| 2012/0054725 A1* | 3/2012 | Inglis et al. | 717/148 |
| 2012/0096447 A1* | 4/2012 | Inglis et al. | 717/148 |
| 2012/0159461 A1* | 6/2012 | Nakaike | 717/139 |
| 2014/0189661 A1* | 7/2014 | Wuerthinger et al. | 717/139 |
| 2015/0046912 A1* | 2/2015 | Vick et al. | 717/152 |

OTHER PUBLICATIONS

Lee et al., "Aggressive Function Splitting for Partial Inlining", IEEE, Feb. 12, 2011, pp. 81-86; <http://ieeexplore.ieee.org/stamp/stamp.jsp?tp=&arnumber=5936700>.*

Zhao et al., "To Inline or Not to Inline? Enhanced Inlining Decisions", Springer-Verlag Berlin Heidelberg Oct. 2003, LCPC 2003, LNCS 2958, pp. 405-419; <http://link.springer.com/chapter/10.1007%2F978-3-540-24644-2_26#page-1>.*

International Search Report and Written Opinion—PCT/US2014/049757—ISA/EPO—Oct. 10, 2014.

* cited by examiner

METHOD FOR CONTROLLING INLINING IN A CODE GENERATOR

RELATED APPLICATIONS

This application claims the benefit of priority to U.S. Provisional Application No. 61/863,341 entitled "Method for Controlling Inlining in a Code Generator" filed Aug. 7, 2013, the entire contents of which are hereby incorporated by reference.

BACKGROUND

Generally, a compiler operating on a computing device, such as a smart phone or personal computer, may perform inline expansion (i.e., inlining) to optimize code. To speed up execution, a compiler may "inline" code by replacing a call site (i.e., the portion of code making a method or function call) with the code body of the called method or function. Inlining code at call sites can significantly improve performance at runtime by reducing execution overhead and time and memory usage and by enabling other optimization opportunities. For example, inlining a call site may avoid overhead associated with making a method or function call, including having to save variables into registers or random access memory and then having to restore those saved variables after the called method is performed. Inlining code may also remove other costs of function calls and return instructions, such as prologue and epilogue code.

However, inlining, especially excessive or unthrottled inlining, may increase the time that a compiler must spend to compile the code (i.e., the compile time). Code compilers expend a great deal of compiler time managing register allocation, which is the most time intensive portion of code generation/compiling. Inlining may increase compile time by adding numerous variables to the code from the called functions. For example, a code compiler may spend a significant amount of time performing register matching when inlining results in code that requires more registers than are available on the underlying computing device.

While such expenditures of time is not an issue with off-line compilers, such time, memory, and processing expenditures are significant for compilers that execute when an application is started (i.e., compile at the time of execution). As the use of smart phones, tablets, and other mobile computing devices that depend on batteries continues to rise, expending battery life has become an increasingly important design consideration. A computing device's power expenditure and code's compile time are strongly correlated. Thus, longer compile times caused by excessive inlining may use significant amounts of battery power, thereby limiting battery life on mobile devices.

Currently, there are several techniques for selectively determining when to throttle inlining of a method or function during compiling. For example, one solution (i.e., a "greedy" inlining algorithm) defines a threshold of how much of the code (e.g., how many bytecodes) may be inlined, and the compiler inlines as much of the code as it can until the threshold is exceeded. Another technique known as frequency- or temperature-based inlining determines the methods or functions that are called with the highest frequency, and the compiler inlines those methods or functions until it has reached a certain threshold, such as a number of bytecodes. In the frequency-based inlining algorithm, those methods or functions that are not used frequently are not inlined.

While current methods of inlining provide some degree of code optimization, these strategies are typically implemented on computing devices that do not rely on battery power (e.g., a PC) and are not designed to reduce compile times.

SUMMARY

The various aspects leverage the novel observation that the number of call sites in code may directly correlate with the code's compile time. Thus, to achieve an effective balance of short compile times and effective code performance, the various aspects provide methods implemented by a compiler operating on a computing device (e.g., a smartphone) for performing inline throttling based on the total projected number of call sites in the code that would exist after performing inline expansion. The various aspects enable the compiler to improve the performance of the generated code by aggressive inlining while managing increases in compile time, thereby decreasing the power required to compile the code while increasing performance of the computing device and the overall user experience.

The various aspects include a method of throttling inline optimization of code by a compiler operating on a computing device by selecting a call site detected during a scan of the code; determining a number of nested function calls in a called function of the call site; determining whether the call site is eligible for inlining based at least on the number of nested function calls in the called function and a call-site counter; and inlining the call site in response to determining that the call site is eligible for inlining. In an aspect, the code may be bytecode. In another aspect, determining whether the call site is eligible for inlining may be based only on a sum of the call-site counter and one of the number of nested function calls and a net change in a number of call sites. In another aspect, the method may include adding the number of nested function calls to the call-site counter after inlining the call site and adding one to the call-site counter in response to determining that the call site is ineligible for inlining.

In an aspect, determining whether the call site is eligible for inlining may include determining whether a sum of the number of nested function calls and the call-site counter exceeds a call-site threshold and determining that the call site is eligible for inlining in response to determining that the sum does not exceed the call-site threshold. In another aspect, determining whether the call site is eligible for inlining may include determining whether the number of nested function calls is greater than one and determining that the call site is eligible for inlining in response to determining that the number of nested function calls is not greater than one. In yet another aspect, determining whether the call site is eligible for inlining may not be based on any of whether the call site is on an execution path, a depth of nested function calls in the call site, how often the call site is called, a size of code in which the call site is located, effects of inlining on a size of the code, whether inlining would result in a stack overflow, and effects of inlining on execution time.

In an aspect, selecting a call site detected during a scan of the code may include detecting a group of call sites during the scan of the code, setting the call-site counter equal to a number of call sites in the group of call sites, ranking the group of call sites based on a number of nested function calls of each of the group of call sites, and selecting the call site based on rank wherein call sites may be selected beginning with a lowest rank. In another aspect, determining whether the call site is eligible for inlining may include determining whether a sum of a net change in the number of call sites and the call-site counter exceeds a call-site threshold, determining that the call site is eligible for inlining in response to determining that the sum does not exceed the call-site threshold, and determining that the call site is ineligible for inlining in response to determining that the sum exceeds the call-site threshold. In another aspect, the method may include adjusting the call-site counter by the net change in the number of nested function calls after inlining the call site. In another aspect, the method may include determining whether each of the group of call sites has been selected, selecting an unselected call site in the group of call sites with a next lowest rank in response to determining that each of the group of call sites has not been selected, and ending inline optimization in response to determining that each of the group of call sites has been selected.

Further aspects include a computing device that may include a memory and a processor coupled to the memory, wherein the processor may be configured with processor-executable instructions to perform operations that include selecting a call site detected during a scan of code, determining a number of nested function calls in a called function of the call site, determining whether the call site is eligible for inlining based at least on the number of nested function calls in the called function and a call-site counter, and inlining the call site in response to determining that the call site is eligible for inlining. In another aspect, the code may be bytecode. In another aspect, the processor may be configured with processor-executable instructions to perform operations such that determining whether the call site is eligible for inlining includes determining whether the call site is eligible for inlining based only on a sum of the call-site counter and one of the number of nested function calls and a net change in a number of call sites.

In another aspect, the processor may be configured with processor-executable instructions to perform operations that include adding the number of nested function calls to the call-site counter after inlining the call site and adding one to the call-site counter in response to determining that the call site is ineligible for inlining.

In an aspect, the processor may be configured with processor-executable instructions to perform operations such that determining whether the call site is eligible for inlining includes determining whether a sum of the number of nested function calls and the call-site counter exceeds a call-site threshold and determining that the call site is eligible for inlining in response to determining that the sum does not exceed the call-site threshold. In another aspect, the processor may be configured with processor-executable instructions to perform operations such that determining whether the call site is eligible for inlining includes determining whether the number of nested function calls is greater than one and determining that the call site is eligible for inlining in response to determining that the number of nested function calls is not greater than one. In another aspect, the processor may be configured with processor-executable instructions to perform operations such that determining whether the call site is eligible for inlining includes determining whether the call site is eligible for inlining not based on any of whether the call site is on an execution path, a depth of nested function calls in the call site, how often the call site is called, a size of code in which the call site is located, effects of inlining on a size of the code, whether inlining would result in a stack overflow, and effects of inlining on execution time.

In an aspect, the processor may be configured with processor-executable instructions to perform operations such that selecting a call site detected during a scan of the code includes detecting a group of call sites during the scan of the code, setting the call-site counter equal to a number of call sites in the group of call sites, ranking the group of call sites based on a number of nested function calls of each of the group of call sites, and selecting the call site based on rank wherein call sites are selected beginning with a lowest rank. In another aspect, the processor may be configured with processor-executable instructions to perform operations such that determining whether the call site is eligible for inlining includes determining whether a sum of a net change in the number of call sites and the call-site counter exceeds a call-site threshold, determining that the call site is eligible for inlining in response to determining that the sum does not exceed the call-site threshold, and determining that the call site is ineligible for inlining in response to determining that the sum exceeds the call-site threshold. In yet another aspect, the processor may be configured with processor-executable instructions to perform operations that include adjusting the call-site counter by the net change in the number of nested function calls after inlining the call site. In another aspect, the processor may be configured with processor-executable instructions to perform operations that include determining whether each of the group of call sites has been selected, selecting an unselected call site in the group of call sites with a next lowest rank in response to determining that each of the group of call sites has not been selected, and ending inline optimization in response to determining that each of the group of call sites has been selected.

Further aspects may include a computing device including means for selecting a call site detected during a scan of code, means for determining a number of nested function calls in a called function of the call site, means for determining whether the call site is eligible for inlining based at least on the number of nested function calls in the called function and a call-site counter, and means for inlining the call site in response to determining that the call site is eligible for inlining. In an aspect, the code may be bytecode. In another aspect, means for determining whether the call site is eligible for inlining may include means for determining whether the call site is eligible for inlining based only on a sum of the call-site counter and one of the number of nested function calls and a net change in a number of call sites.

In an aspect, the computing device may include means for adding the number of nested function calls to the call-site counter after inlining the call site and means for adding one to the call-site counter in response to determining that the call site is ineligible for inlining.

In an aspect, means for determining whether the call site is eligible for inlining may include means for determining whether a sum of the number of nested function calls and the call-site counter exceeds a call-site threshold and means for determining that the call site is eligible for inlining in response to determining that the sum does not exceed the call-site threshold. In another aspect, means for determining whether the call site is eligible for inlining may include means for determining whether the number of nested function calls is greater than one and means for determining that the call site is eligible for inlining in response to determining that the number of nested function calls is not greater than one.

In another aspect, means for determining whether the call site is eligible for inlining may include means for determining whether the call site is eligible for inlining not based on any of whether the call site is on an execution path, a depth of nested function calls in the call site, how often the call site is called, a size of code in which the call site is located, effects of inlining on a size of the code, whether inlining would result in a stack overflow, and effects of inlining on execution time.

In an aspect, means for selecting a call site detected during a scan of the code may include means for detecting a group of call sites during the scan of the code, means for setting the call-site counter equal to a number of call sites in the group of call sites, means for ranking the group of call sites based on a number of nested function calls of each of the group of call sites, and means for selecting the call site based on rank wherein call sites are selected beginning with a lowest rank. In another aspect, means for determining whether the call site is eligible for inlining may include means for determining whether a sum of a net change in the number of call sites and the call-site counter exceeds a call-site threshold, means for determining that the call site is eligible for inlining in response to determining that the sum does not exceed the call-site threshold, and means for determining that the call site is ineligible for inlining in response to determining that the sum exceeds the call-site threshold. In another aspect, the computing device may include means for adjusting the call-site counter by the net change in the number of nested function calls after inlining the call site. In yet another aspect, the computing device may include means for determining whether each of the group of call sites has been selected, means for selecting an unselected call site in the group of call sites with a next lowest rank in response to determining that each of the group of call sites has not been selected, and means for ending inline optimization in response to determining that each of the group of call sites has been selected.

In further aspects, a non-transitory processor-readable storage medium may have stored thereon processor-executable software instructions configured to cause a processor to perform operations for throttling inline optimization of code, the operations including selecting a call site detected during a scan of the code, determining a number of nested function calls in a called function of the call site, determining whether the call site is eligible for inlining based at least on the number of nested function calls in the called function and a call-site counter, and inlining the call site in response to determining that the call site is eligible for inlining. In another aspect, the code may be bytecode. In another aspect, the stored processor-executable software instructions may be configured to cause a processor of a computing device to perform operations such that determining whether the call site is eligible for inlining includes determining whether the call site is eligible for inlining based only on a sum of the call-site counter and one of the number of nested function calls and a net change in a number of call sites.

In another aspect, the stored processor-executable software instructions may be configured to cause a processor of a computing device to perform operations including adding the number of nested function calls to the call-site counter after inlining the call site and adding one to the call-site counter in response to determining that the call site is ineligible for inlining.

In another aspect, the stored processor-executable software instructions may be configured to cause a processor of a computing device to perform operations such that determining whether the call site is eligible for inlining includes determining whether a sum of the number of nested function calls and the call-site counter exceeds a call-site threshold and determining that the call site is eligible for inlining in response to determining that the sum does not exceed the call-site threshold. In another aspect, the stored processor-executable software instructions may be configured to cause a processor of a computing device to perform operations such that determining whether the call site is eligible for inlining includes determining whether the number of nested function calls is greater than one, and determining that the call site is eligible for inlining in response to determining that the number of nested function calls is not greater than one. In yet another aspect, the stored processor-executable software instructions may be configured to cause a processor of a computing device to perform operations such that determining whether the call site is eligible for inlining includes determining whether the call site is eligible for inlining not based on any of whether the call site is on an execution path, a depth of nested function calls in the call site, how often the call site is called, a size of code in which the call site is located, effects of inlining on a size of the code, whether inlining would result in a stack overflow, and effects of inlining on execution time.

In an aspect, the stored processor-executable software instructions may be configured to cause a processor of a computing device to perform operations such that selecting a call site detected during a scan of the code includes detecting a group of call sites during the scan of the code, setting the call-site counter equal to a number of call sites in the group of call sites, ranking the group of call sites based on a number of nested function calls of each of the group of call sites, and selecting the call site based on rank wherein call sites are selected beginning with a lowest rank. In another aspect, the stored processor-executable software instructions may be configured to cause a processor of a computing device to perform operations such that determining whether the call site is eligible for inlining includes determining whether a sum of a net change in the number of call sites and the call-site counter exceeds a call-site threshold, determining that the call site is eligible for inlining in response to determining that the sum does not exceed the call-site threshold, and determining that the call site is ineligible for inlining in response to determining that the sum exceeds the call-site threshold. In another aspect, the stored processor-executable software instructions may be configured to cause a processor of a computing device to perform operations including adjusting the call-site counter by the net change in the number of nested function calls after inlining the call site. In yet another aspect, the stored processor-executable software instructions may be configured to cause a processor of a computing device to perform operations including determining whether each of the group of call sites has been selected, selecting an unselected call site in the group of call sites with a next lowest rank in response to determining that each of the group of call sites has not been selected, and ending inline optimization in response to determining that each of the group of call sites has been selected.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
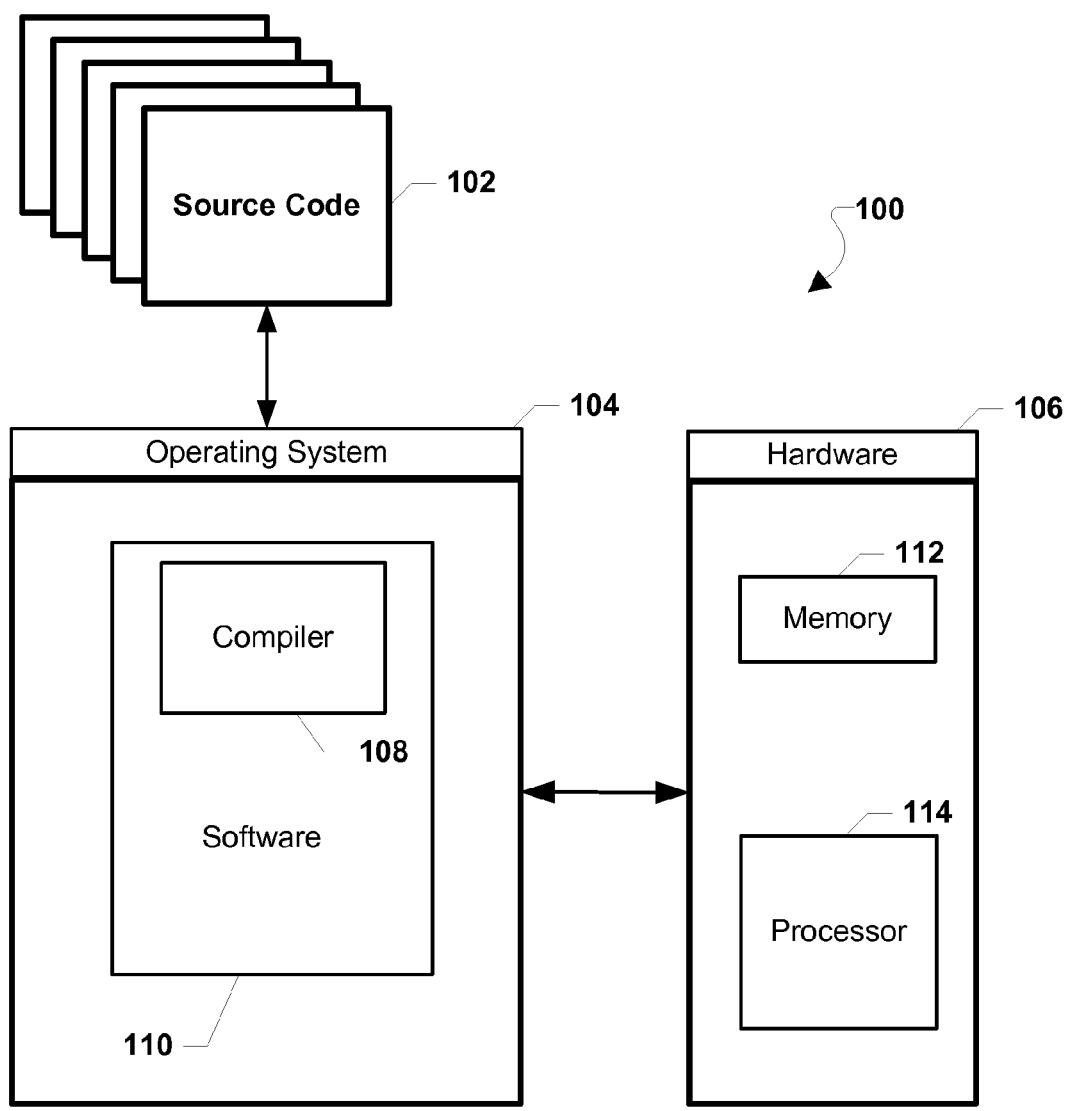
FIG. 1 is a system block diagram of a typical computing device suitable for use with the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" is used herein to refer to any one or all of personal computers, servers, desktop computers, cellular telephones, smartphones, personal or mobile multimedia players, personal data assistants (PDA's), laptop computers, tablet computers, smartbooks, palm-top computers, wireless electronic mail receivers, multimedia Internet enabled cellular telephones, wireless gaming controllers, and similar electronic devices that include a programmable processor and a memory. While the various aspects are particularly useful in mobile computing devices, such as cellular telephones, which have limited processing power and battery capacity, the aspects are generally useful in any computing device that may benefit from reduced compile times and reduced energy consumption.

As discussed above, current techniques for throttling inlining to avoid some of the costs of excessive inlining, such as increased code size, are not designed to achieve an ideal balance of code optimization and compile time. Generally, these strategies are implemented on computing devices that are not dependent on battery power. For such computing devices, the increase in compile time has little if any impact on the end user. On the other hand, for mobile computing devices that utilize contemporary inline throttling techniques, the end user may be acutely aware of the decrease in battery life caused by the increased compile times associated with excessive inlining. Therefore, a user of a computing device, especially a mobile computing device, may benefit from an inline throttling algorithm that achieves shorter compile times, thereby conserving power, without sacrificing code optimization potential.

The various aspects leverage the novel observation that the number of call sites in code may directly correlate with the code's compile time; in other words, code with fewer call sites have faster compile times. By inlining enough call sites in the code to reduce the costs of handling calls while accounting for the costs of inlining, the various aspects provide for an effective balance of short compile times and effective code performance.

In overview, the various aspects provide methods implemented by a compiler operating on a computing device (e.g., a smartphone) for performing inline throttling based on the total projected number of call sites in the code that would exist after performing inline expansion. The various aspects enable the compiler to improve the performance of the generated code by aggressive inlining while managing increases in compile time, thereby decreasing the power required to compile the code while increasing performance of the computing device and the overall user experience.

In various aspects, the compiler may inline call sites in such a way as to keep the total number of call sites in the code below a certain threshold or maximum number (i.e., a call-site threshold). In an aspect, the call-site threshold may represent a number of call sites in the code that may enable the compiler to achieve a desirable or ideal compile time and code performance. In other words, the compiler may utilize the call-site threshold to balance the costs of inlining (e.g., increased compile times) against the benefits of inlining (e.g., faster code execution). Thus, in the various aspects, the determination of whether to inline a call site may hinge on how inlining a call site affects the total number of call sites in the code. This determination differs from other criteria used in convention methods, such as the number of nested function calls associated with the call site being inlined.

In an aspect, the compiler may scan through the code for call sites. When the compiler detects a call site while scanning the code, the compiler may determine whether the detected call site is eligible for inlining. In an aspect, the compiler may inline an eligible call site and may increase a current count of the number of call sites in the code (i.e., a call-site counter) by the number of nested function calls that are included in the call site's called function. When the compiler determines that the call site is ineligible for inlining, the compiler may continue scanning through the code without inlining the ineligible call site and may increase the call-site counter by one to represent the ineligible call site.

In an aspect, the compiler may determine that a detected call site is eligible for inlining when replacing the call site with the code body of the call site's called function (i.e. inlining the call site) would not increase the number of call sites in the code beyond the call-site threshold. As further discussed below, the call site's called function may itself include a number of function calls (i.e., nested function calls) that, if inlined, would contribute to the total number of non-inlined call sites in the code. In an aspect, upon detecting a call site, the compiler may calculate the total number of call sites that would exist in the code after inlining a call site—represented as the sum of the call-site counter plus the number of nested function calls in the call site's called function—and may determine whether the call site is eligible for inlining based on whether that sum exceeds the call-site threshold.

In another aspect, a compiler may perform an initial scan of the code for calls sites and may rank each of the call sites based on the number of nested function calls included in each call site's called function. For example, call sites with fewer nested function calls included in their called functions may have a lower rank. In a further aspect, the compiler may select call sites from lowest to highest rank, may determine whether the call sites are eligible for inlining (i.e., whether inlining the call site would result in too many total call sites), and may inline eligible call sites. In such an aspect, the compiler may continue inlining call sites from the lowest rank to the highest rank until the call-site determines that a call site is ineligible for inlining (i.e., the call-site sum would exceed the call-site threshold). In that event, the compiler may end inline optimization because the remaining call sites are each guaranteed to be ineligible for inlining because the remaining call sites have higher ranks, meaning that the remaining call sites have the same or more nested function calls than the first call site determined to be ineligible for inlining.

The various aspects may be implemented within a variety of computing devices 100, an example of which is illustrated in FIG. 1. In an aspect, a computing device 100 may include an operating system 104. The operating system 104 may be a high-level operating system used to manage and execute various software 110 on the computing device 100. The operating system 104 may also enable various software 110 to access hardware resources 106, such as memory 112 and a processor 114.

In another aspect, the operating system 104 may host a compiler 108. The compiler may be one or more software programs that transforms source code 102 written in one programming language (i.e., the source language) into another programming language (i.e., the target language). For example, the source code 102 may be a collection of computer instructions typically written using a human-readable programming language, such as Java®, C++, Perl®, Python®, etc., and the compiler 108 may transform the source code 102 into an executable program. In another aspect, the source code may be in the form of bytecode (i.e., code typically compiled by dynamic compilers and usable on various different platforms). The source code 102 may exist as one or more files or in a database and may be stored on various types of storage media (not shown), such as optical disks or hard-drive disks.

The compiler 108 may access the hardware resources 106 through the operating system 104 to facilitate compiling the source code 102 into a more useful form. For example, the compiler 108 may have access to the memory 112 (e.g., RAM) and various registers (not shown) and may utilize the processing capabilities of the processor 114.

Figure 2:
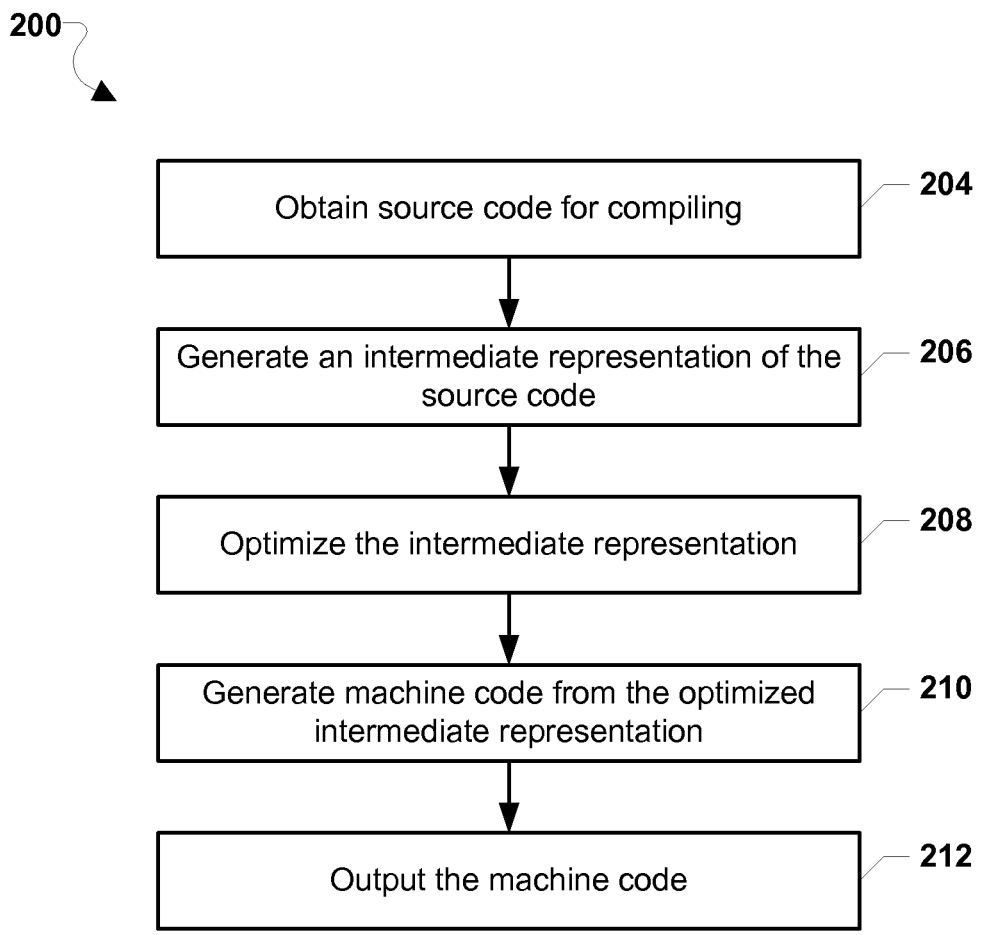
FIG. 2 is a process flow diagram illustrating a typical method for compiling source code.

FIG. 2 illustrates a conventional method 200 that may be implemented in a compiler for compiling source code into executable code. In block 204, the compiler may obtain source code for compiling. For example, the compiler may access source code stored on a hard drive included on the computing device. In another aspect (not shown), the compiler may be a dynamic compiler or a "just-in-time" compiler, and the source code may be in the form of bytecode that was previously generated from other source code.

The compiler may also generate an intermediate representation of the source code in block 206. For example, the compiler may perform various operations to prepare the source code for optimization, such as by checking the code for proper syntax and semantics, parsing the source code, and building a corresponding parse tree and symbol table. In another aspect, the compiler may be a dynamic compiler and may generate an intermediate representation of bytecode in preparation of performing various optimizations as further described below.

In block 208, the compiler may optimize the intermediate representation. The compiler may implement various optimization strategies. For example, the compiler may remove useless or unreachable code, discover and propagate constant values, relocate computation to a less frequently executed place (e.g., moving an operation/instruction out of a loop), or specializing a computation based on the context.

The compiler may also generate executable code from the optimized intermediate representation in block 210. For example, the compiler may convert the optimized intermediate representation to machine code that may be executed by a processor on the computing device. In other example, the compiler may convert the optimized intermediate representation of bytecode into machine language that has been optimized to run on that particular computing device. The compiler may also output the executable code in block 212. For example, the compiler may output the executable code in the form of an executable application or program.

Figure 3:
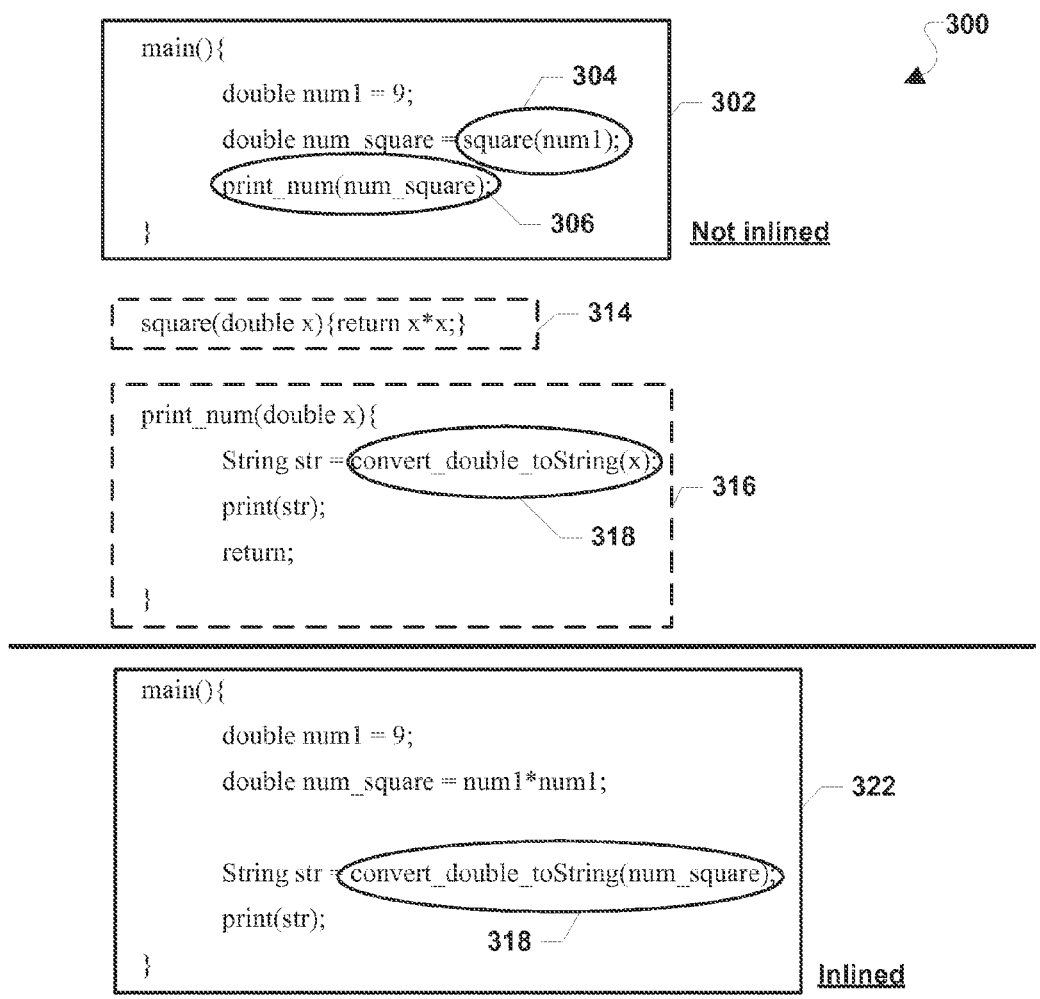
FIG. 3 is an illustration of a segment of code before and after inline expansion.

FIG. 3 illustrates an example segment of code 300 before and after inline optimization according to an aspect. The compiler may receive source code that includes high-level, human-readable code, for example. This code may include various called functions 302, 314, 316 (i.e., groups of instructions) that may include function calls. Method/function calls (i.e., call sites) may cause the flow of operation to pass from the calling function to the called function and then back to the calling function after the called function's operations are performed.

In an aspect, the compiler may perform inline optimization on an unoptimized function 302. In an example, the unoptimized function 302 may square the number nine and print the result to an output, such as a display or a file stored on a computing device. Before inlining, the unoptimized function 302 may include call sites 304, 306, which are function calls to called functions 314, 316, respectively.

Continuing with the above example, the unoptimized function 302 may initialize the variable "num1" to have a value of nine. The unoptimized function 302 may also initialize another variable "num_square" and assign it the value returned after calling the called function 314 with the variable "num1" as input (i.e., "square(num1)"). The called function 314 may square "num1" and return the squared value to the unoptimized function 302. The unoptimized function 302 may then assign the squared value to the variable "num_square."

The unoptimized function 302 may then call called function 316 at call site 306 and pass the variable "num_square" to called function 316 as input (i.e., "print_num(num_square)"). Called function 316 may convert "num_square" to a String type object by performing another function call at call site 318 to another called function "convert_double_toString," and may print the converted string as output. The control flow may then return to the unoptimized function 302 and resume after the call site 306.

Each function call made in the unoptimized function 302 may increase compile time because, for example, the variables and values of the unoptimized function 302 must be stored in a stack before control passes to a called function, and the variables and values must be restored from the stack after operations return to the unoptimized function 302 from the called function.

The compiler may perform inline optimization of the unoptimized function 302 to reduce compile time. After the compiler performs inline expansion of the call sites 304, 306, the unoptimized function 302 may resemble optimized function 322. As a part of the inlining process, the compiler may replace call sites 304, 306 with the code body from called functions 314, 316, respectively. Thus, after inline optimization, the optimized function 322 may not include call sites 304, 306 and instead may contain the code body of called functions 314, 316. Because called function 316 includes a call site 318 to another called function (i.e., a nested function call), optimized function 322 may also include the call site 318 after inlining call site 306.

As illustrated by the optimized function 322, inlining may change the number of call sites that are included in the code being optimized. For example, the unoptimized function 302 originally may have two call sites (i.e., call sites 304, 306), but after inline optimization, the optimized function 322 may only have one call site (i.e., call site 318). However, in another example (not shown), if a called function were more complicated and included ten nested function calls, the optimized function would instead include nine call sites after inline optimization. In other words, the net change in the number of call sites included in a function after inline optimization may equal the number of nested call sites included in called functions minus the number of original call sites being replaced as a result of inlining.

In various aspects, the compiler may implement inline throttling to ensure that inline optimization does not result in too many call sites being included in an optimized method as a result of inline optimization.

Figure 4:
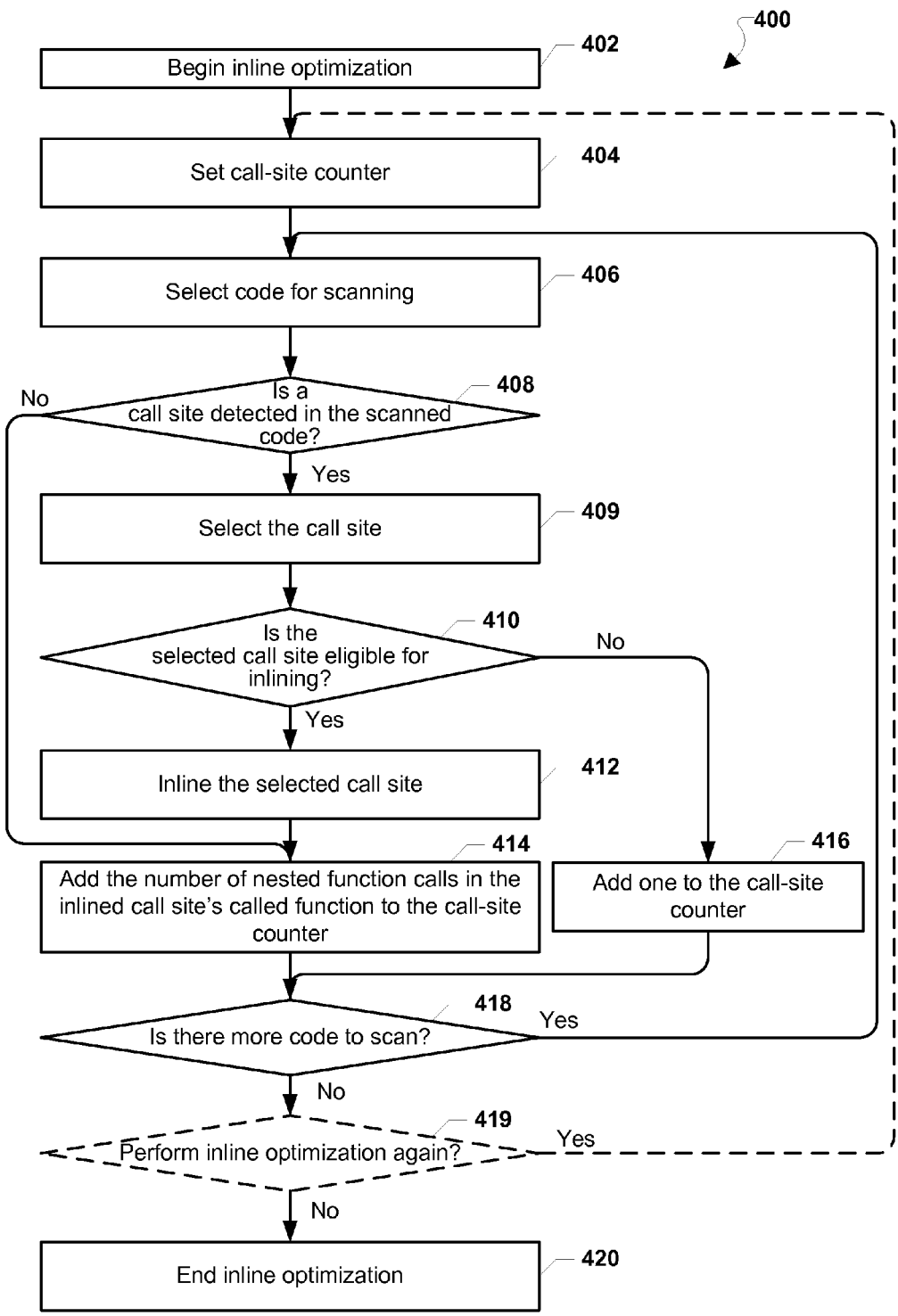
FIG. 4 is a process flow diagram illustrating an aspect method of throttling inline optimization of code.

FIG. 4 illustrates an aspect method 400 that may be implemented by a compiler for implementing inline throttling. In an aspect, the operations of method 400 implement an aspect of the operations of block 208 of method 200 described above with reference to FIG. 2. The compiler may begin inline optimization in block 402.

In block 404, the compiler may set a call-site counter. In an aspect, while scanning the code, the compiler may use the call-site counter to keep track of how many detected call sites are in the code.

In block 406, the compiler may select code for scanning. In an aspect, the compiler may scan a portion of source code (e.g., Java® bytecode) less than the entire source code (e.g., unoptimized function 302 as discussed above with reference to FIG. 3). In such an aspect, the compiler may separately perform the process on one or more other portions of the source code. In another aspect, the compiler may scan the entire source code. In another aspect (not shown), the compiler may scan through the code by traversing one or more control flow graphs formed from the intermediate representation of the selected code. In a further aspect, the compiler may scan through the code without forming a program call graph.

In determination block 408, the compiler may determine whether a call site is detected in the scanned code. In other words, the compiler may scan the code until it finds a function call instruction, such as call sites 304, 306, 318 discussed above with reference to FIG. 3. When the compiler determines that a call site has not been detected (i.e., determination block 408="No"), the compiler may determine whether there is more code to scan in determination block 418 and continue scanning by selecting the next portion of code in block 406 when there is more code to scan (i.e., determination block 418="Yes").

When the compiler detects a call site in the selected code (i.e., determination block 408="Yes"), the compiler may select the call site in block 409. In determination block 410, the compiler may determine whether the selected call site is eligible for inlining. In an aspect, the compiler may determine that a call site is eligible for inlining when the costs of inlining the call site (e.g., increased compile time) would not outweigh the benefits of inlining. For example, the compiler may determine that a call site is ineligible for inlining because inlining the call site would result in too many total call sites in the code, thereby slowing overall compile time. The process of determining whether the called function of the call site is eligible for inlining is further discussed below with reference to FIG. 5.

If the compiler determines that the selected call site is ineligible for inlining (i.e., determination block 410="No"), the compiler may add one to the call-site counter in block 416. In this situation the compiler increments the call-site counter by one because the compiler determined not to inline the call site. The compiler may then determine whether there is more code to scan in determination block 418 and continue scanning by selecting the next portion of code in block 406 when there is more code to scan (i.e., determination block 418="Yes").

If the compiler determines that the selected call site is eligible for inlining (i.e., determination block 410="Yes"), the compiler may inline the selected call site in block 412. In an aspect, the compiler may inline the call site by replacing the call site with the code body of the call site's called function. The code body of the call site's called function may include zero or a number of nested function calls. The compiler may add the number of nested function calls in the inlined call site's called function to the call-site counter in block 414. For instance, the compiler may add zero to the call-site counter when the called function includes no nested function calls (e.g., called function 314 as discussed above with reference to FIG. 3) and add one to the call-site counter for each nested function calls in the called function (e.g., called function 316 as discussed above with reference to FIG. 3).

When the inlining is finished the compiler may determine whether there is more code to scan in determination block 418 and continue scanning by selecting the next portion of code in block 406 when there is more code to scan (i.e., determination block 418="Yes").

When the compiler determines that there is no more code to scan (i.e., determination block 418="No"), the compiler may optionally determine whether to perform inline optimization again in optional determination block 419. In an aspect, the compiler may further optimize the code by rescanning the code and determining whether the call sites in the code—including any nested function calls introduced into the code as a result of inline optimization—are eligible for inlining. In another aspect, the compiler may make the determination of whether to perform inline optimization again based on various factors. In an aspect, the compiler may determine to perform inline optimization again a certain predetermined number of times. In another aspect, the compiler may determine to perform inline optimization again based on how close the value of the call-site counter is to the call-site threshold after the last round of inline optimization. In another aspect, the compiler may determine to perform inline optimization again when the call-site counter is less than a certain percentage of the call-site threshold (i.e., when the current number of call sites in the code is not close to the call-site threshold). In another aspect, the compiler may not repeat the process, and instead perform the various operations of method 400 in a single scan of the code.

If the compiler determines that it should perform inline optimization again (i.e., optional determination block 419="Yes"), the compiler may begin repeating the process of performing inline optimization by resetting the call-site counter in block 404. In that event, the process may continue in a loop until the compiler determines not to perform inline optimization again (i.e., optional determination block 419="No"), at which point the compiler may end inline optimization in block 420.

Figure 5:
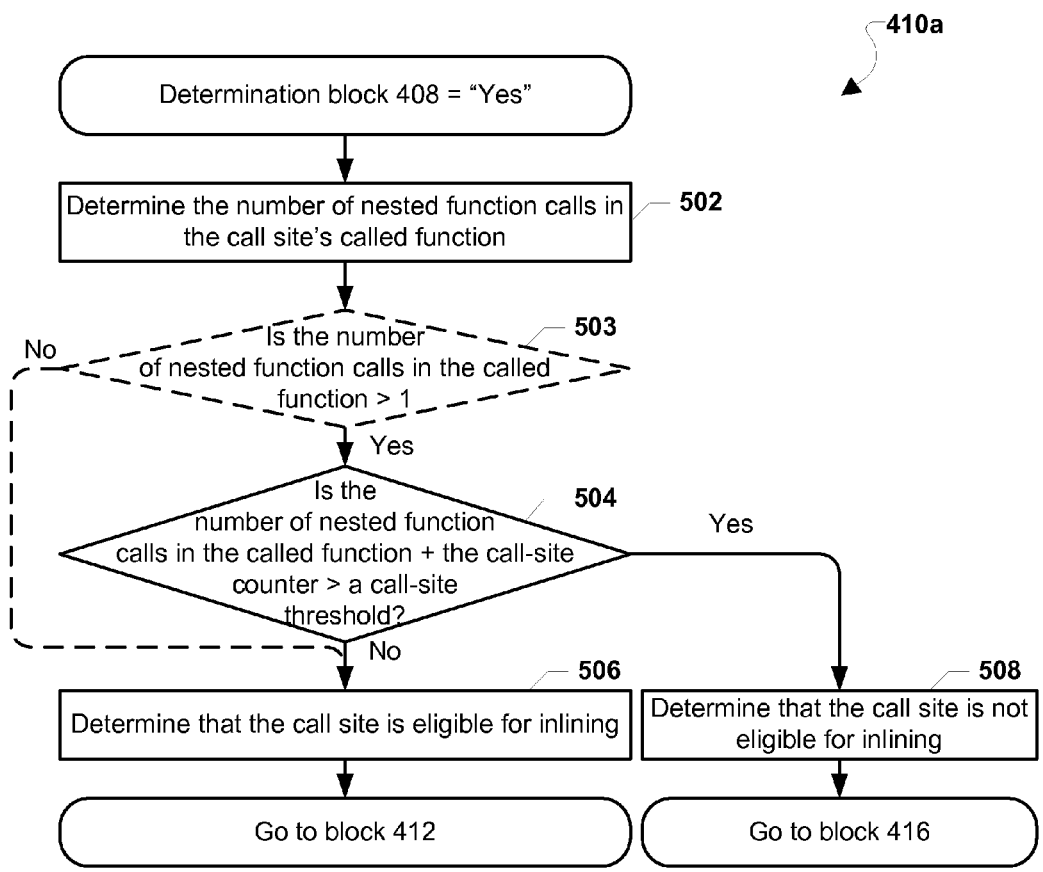
FIG. 5 is a process flow diagram illustrating an aspect method for determining whether a call site is eligible for inlining.

FIG. 5 illustrates an aspect method 410a that may be implemented by a compiler operating on a computing device for determining whether a call site is eligible for inlining. The operations of method 410a implement an aspect of the operations of determination block 410 of method 400 described above with reference to FIG. 4. The compiler may begin performing method 500 after determining that a call site is detected in the code (i.e., determination block 408="Yes").

In block 502, the compiler may determine the number of nested function calls in the call site's called function. For instance, the compiler may scan the called function and determine that the called function includes zero or more calls to other methods or functions as described above with reference to called functions 314, 316 illustrated in FIG. 3.

The compiler may also determine whether the number of nested function calls in the called function is greater than one in optional determination block 503. In an aspect, the compiler may determine that a call site is eligible for inlining when the total number of call sites in the code would not increase (i.e., when there is no positive net change to the number of call sites in the code) as a result of inlining. For example, there may be no net change in the number of call sites when the called function includes only one nested function call because the nested function call, as part of the called method's code body, replaces the call site. In another example, the total number of call sites may be decreased by one (i.e., a net decrease) when the called function includes no nested function calls for similar reasons. If the number of nested function calls in the called function does not exceed one (i.e., optional determination block 503="No"), the compiler may determine that the call site is eligible for inlining in block 506. In this event, the compiler may inline the call site in block 412 of method 400 as described above with reference to FIG. 4.

If the number of nested function calls in the called function exceeds one (i.e., optional determination block 503="Yes"), the compiler may determine whether the sum of the number of nested function calls in the called function and the call-site counter exceeds a call-site threshold in determination block 504. In an aspect, the call-site threshold may be the maximum number of call sites that may be included in the code being optimized as described above. Thus, the compiler may determine whether inlining the call site introduces too many call sites into the code from the called function, resulting in an undesirable increase in compile time.

In the various aspects, only the sum of the number of nested function calls in a call site's called function and the call-site counter may be relevant to determining whether a call site is eligible for inlining. For example, a call site may be eligible for inlining even though the call site is associated with ten nested function calls because the call-site counter has a low enough value such that the sum of the nested function calls and the call-site counter is less than the call-site threshold. In another example, a call site may not be eligible for inlining when the call site is associated with two nested function calls because the call-site counter has a high value such that the sum of the nested function calls and the call-site counter exceeds the call-site threshold.

In an aspect, the determination of whether to inline a particular call site may not be based on other factors, including whether the call site is on an execution path, the depth of nested function calls in the called function of the call site, the frequency in which the call site may be called, the size of code in which the call site is located, the effects of inlining on code size/code bloat, whether inlining would result in a stack overflow, and the effects of inlining on execution time and/or paths.

Returning to FIG. 5, if the compiler determines that the sum of the nested function calls in the called function and the call-site counter exceeds the call-site threshold (i.e., determination block 504="Yes"), the compiler may determine that the call site is ineligible for inlining in block 508. In this event, the compiler may add one to the call-site counter in block 416 of method 400 as described above with reference to FIG. 4.

If the compiler determines that the sum of the nested function calls in the called function and the call-site counter does not exceed a call-site threshold (i.e., determination block 504="No"), the compiler may determine that the call site is eligible for inlining in block 508. In this event, the compiler may inline the call site in block 412 of method 400 as described above with reference to FIG. 4.

Figure 6:
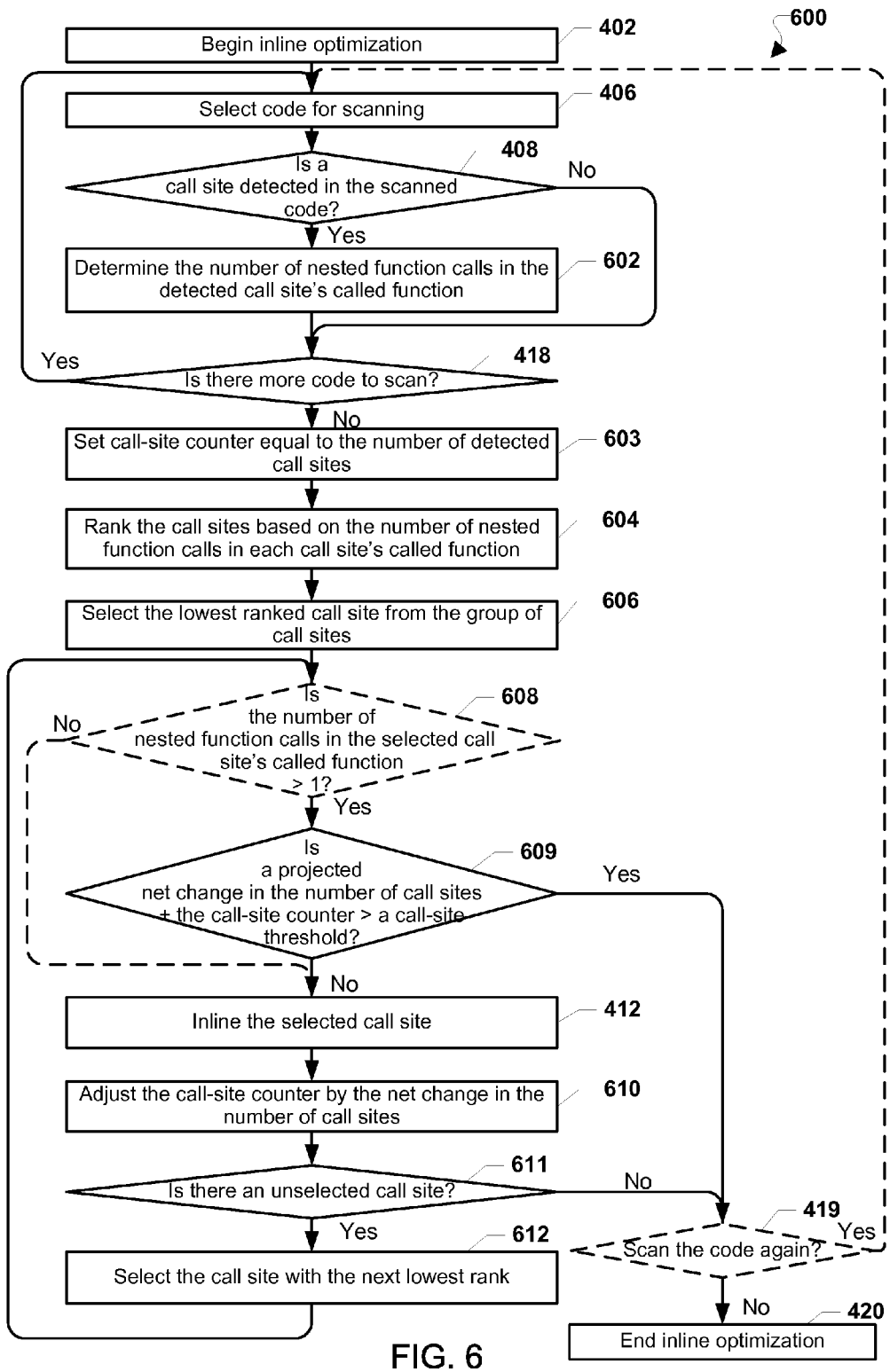
FIG. 6 is a process flow diagram illustrating an aspect method for throttling inline optimization of code based on a ranking of call sites in code being optimized.

FIG. 6 illustrates an aspect method 600 that may be implemented by a compiler for implementing throttled inlining based on a ranking of the call sites in the code. The operations in blocks 402, 406, 408, 418, 412, 419 and 420 may be substantially similar to the operations describe above for like number blocks with reference to FIG. 4. The compiler may begin inline optimization in block 402 and select code for scanning in block 406. In determination block 408, the compiler may determine whether a call site is detected in the selected code. In an aspect, the compiler may step through the selected code and look for an indication of a function call, such as a jump instruction. If the compiler does not detect a call site in the selected code (i.e., determination block 408="No"), the compiler may determine whether there is more code to scan in determination block 418.

If the compiler detects a call site in the selected code segment (i.e., determination block 408="Yes"), the compiler may determine the number of nested function calls in the detected call site's called function in block 602. In an aspect, the compiler may scan the code of the called function to determine how many nested function calls are included in the called function.

In another aspect (not shown), the compiler may maintain a list of call sites detected in the scanned code. The list may include each detected call site and the respective number of nested function calls in each detected call site's called function. In a further aspect, the compiler may add each detected call site to the list during the compiler's scan of the code.

The compiler may also determine whether there is more code to scan in determination block 418. If the compiler determines that there is more code to scan (i.e., determination block 418="Yes"), these process may continue in a loop with the compiler selecting the next portion code for scanning in block 406, determining whether there is a call site in the selected code in determination block 408, and determining the number of nested functions in the detected call site until the compiler determines that there is no more code to scan (i.e., determination block 418="No"), at which point the rest of the method 600 may proceed.

In block 603, the compiler may set a call-site counter equal to the number of detected call sites. The call-site counter may be set at any point, such as after the code scanning or before code scanning in which case the compiler may keep a count of the number of detected call sites while the compiler scans through the code.

In block 604, the compiler may rank the call sites based on the number of nested function calls in each call site's called function. In an aspect, the compiler may assign a higher rank to a call site that has a called function with a greater number of nested function calls than to a call site that has a called function with a fewer number of nested function calls. For example, a call site with three nested function calls in its called function may have a higher rank than a call site with zero nested function calls in its called function. The compiler may also implement various tie-breaker algorithms to rank call sites that have called functions with an equal number of nested function calls.

In a further aspect, the compiler may utilize the list of calls sites generated while scanning the code to rank the call sites in block 604. For instance, the compiler may perform a simple sorting operation on the call sites based on their associated number of nested function calls as the call sites are stored in the list.

In block 606, the compiler may select the lowest-ranked call site from the group of call sites for inlining. For example, the compiler may first select a call site with zero nested function calls in its called function.

The compiler may also optionally determine whether the number of nested function calls in the selected call site's called function is greater than one in optional determination block 608. In an aspect, the compiler may always determine that a selected call site is eligible for inlining when the called function has no more than one nested function call. In this event, inlining the selected call site will not produce a net gain in the number of call sites in the code because the call site is either replaced by one nested function call (resulting in a net increase of zero) or is replaced by no nested function call (resulting in a net decrease of one). If the compiler determines that the number of nested function calls in the selected call site's called function is not greater than one (i.e., optional determination block 608="No"), the compiler may inline the selected call site in block 412.

If the compiler determines that the number of nested function calls in the selected call site's called function is greater than one (i.e., optional determination block 608="Yes"), the compiler may determine whether the sum of the projected net change in the number of call sites and the call-site counter exceeds a call-site threshold in determination block 609. In other words, the compiler may determine whether the call site is eligible for inlining (i.e., whether there would be too many total call sites in the code after inlining) in a manner similar to that described above with reference to FIG. 5.

In an aspect, the determination of whether to inline a particular call site may be based solely on whether the sum of the projected net change in the number of call sites and the call-site counter exceeds the call-site threshold. In a further aspect, the determination of whether to inline a particular call site may not be based on other factors, including whether the call site is on an execution path, the depth of nested function calls in the call site, the frequency in which the call site may be called, the size of the selected code in which the call site is located, the effects of inlining on code size/code bloat, whether inlining would result in a stack overflow, and the effects of inlining on execution time and/or paths.

If the compiler determines that the sum of the projected net change in the number of call sites and the call-site counter does not exceed the call-site threshold (i.e., determination block 609="No"), the compiler may inline the selected call site in block 412.

The compiler may adjust the call-site counter by the net change in the number of call sites in block 610. In an aspect, the call-site counter may continually be adjusted to account for the change in the number of call sites in the code resulting from the inlining process. For example, the compiler may inline a call site with the body of a called function that includes three nested function calls, which may increase the total number of call sites in the code to be optimized by two (i.e., three new call sites minus the one inlined/replaced call site for a net change of two). In another example, when the calls site's called function includes zero nested function calls, the call-site counter may be decremented since the overall number of call sites in the code to be optimized will be decreased by one (i.e., zero new call sites minus one inlined call site for a net change of minus one).

In determination block 611, the compiler may determine whether there is an unselected call site in the ranked call sites. In an aspect, the compiler may have finished inline optimization when each ranked call site has been selected for a determination of whether that call site is eligible for inlining as discussed above with reference to optional determination block 608 and determination block 609. If the compiler determines that there is not another call site to select (i.e., determination block 611="No"), the compiler may optionally determine whether to scan the code again in optional determination block 419.

If the compiler determines that there is another call site to select (i.e., determination block 611="Yes"), the compiler may select the call site with the next lowest rank in block 612 and may repeat the processes of inlining code described above until there is not another call site to select (i.e., determination block 611="No").

If the compiler determines that the sum of the number of function calls in the called function of the selected call site and the call-site counter exceeds the call-site threshold (i.e., determination block 609="Yes"), the compiler may determine whether to scan the code again in optional determination block 419. In an aspect, the compiler may end inline optimization in block 420 when it determines that the selected call site is ineligible for inlining because, as the call sites are ranked in increasing order based on the number of nested function calls in their respective called functions, any unselected call site is guaranteed to be ineligible for inlining because the unselected call site has a higher rank than the call site determined to be ineligible for inlining.

As discussed above with reference to FIG. 4, the compiler may determine whether to make another pass through the code to determine whether any of the call sites (including call sites inlined from called functions) are eligible for inlining in optional determination block 419. If the compiler determines to scan the code again (i.e., optional determination block 419="Yes"), the compiler may repeat the processes of method 600 by selecting code for scanning in block 406 and proceeding as described above. When the compiler determines not to scan the code again (i.e., optional determination block 419="No"), the compiler may end inline optimization in block 420.

Figure 7:
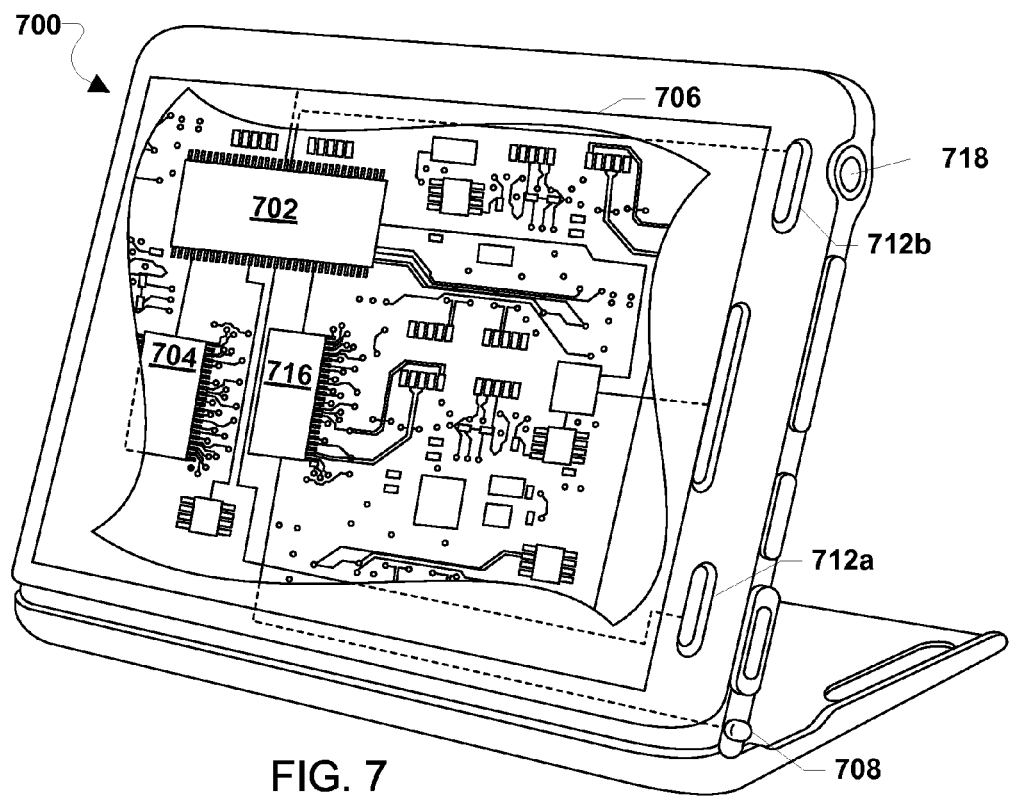
FIG. 7 is a block diagram of an example computing device according to an aspect.

The various aspects may be implemented in any of a variety of computing devices, an example of which is illustrated in FIG. 7. For example, the computing device 700 may include a processor 702 coupled to internal memory 704. Internal memory 704 may be volatile or non-volatile memory, and may also be secure and/or encrypted memory, or unsecure and/or unencrypted memory, or any combination thereof. The processor 702 may also be coupled to a touch screen display 706, such as a resistive-sensing touch screen, capacitive-sensing touch screen infrared sensing touch screen, or the like. Additionally, the display of the computing device 700 need not have touch screen capability. Additionally, the computing device 700 may have one or more antenna 708 for sending and receiving electromagnetic radiation that may be connected to a wireless data link and/or cellular telephone transceiver 716 coupled to the processor 702. The computing device 700 may also include physical buttons 712a and 712b for receiving user inputs. The computing device 700 may also include a power button 718 for turning the computing device 700 on and off.

Figure 8:
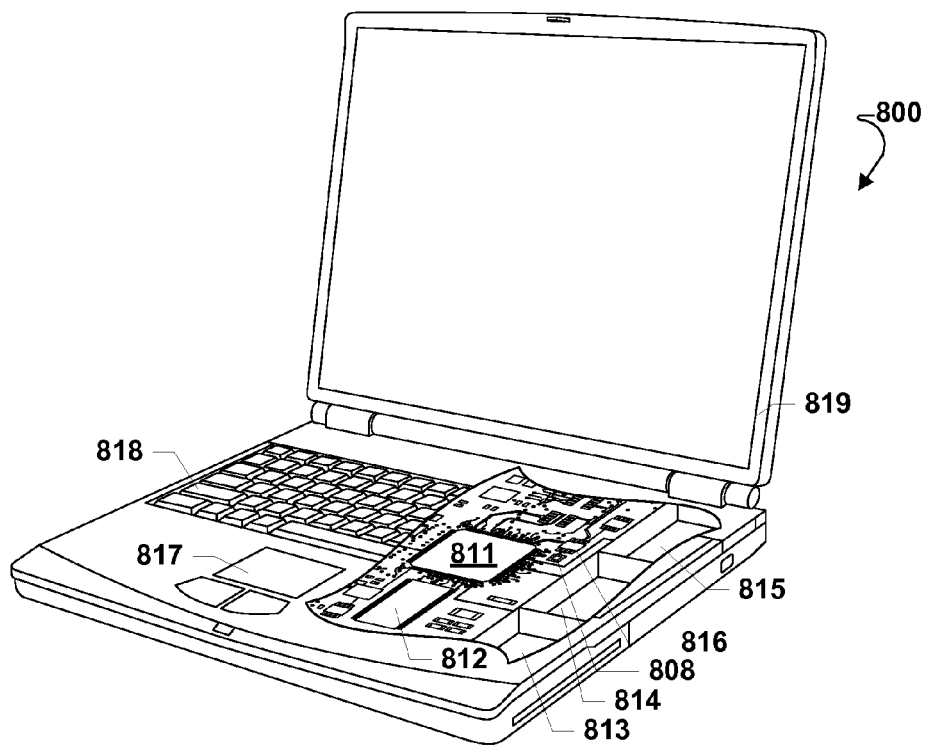
FIG. 8 is a block diagram of another example computing device according to an aspect.

The various aspects described above may also be implemented within a variety of computing devices, such as a laptop computer 800 illustrated in FIG. 8. Many laptop computers include a touchpad touch surface 817 that serves as the computer's pointing device, and thus may receive drag, scroll, and flick gestures similar to those implemented on mobile computing devices equipped with a touch screen display and described above. A laptop computer 800 will typically include a processor 811 coupled to volatile memory 812 and a large capacity nonvolatile memory, such as a disk drive 813 of Flash memory. Additionally, the computer 800 may have one or more antenna 808 for sending and receiving electromagnetic radiation that may be connected to a wireless data link and/or cellular telephone transceiver 816 coupled to the processor 811. The computer 800 may also include a floppy disc drive 814 and a compact disc (CD) drive 815 coupled to the processor 811. In a notebook configuration, the computer housing includes the touchpad 817, the keyboard 818, and the display 819 all coupled to the processor 811. Other configurations of the computing device may include a computer mouse or trackball coupled to the processor (e.g., via a USB input) as are well known, which may also be use in conjunction with the various aspects.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium (i.e., stored processor-executable software instructions). The steps of a method or algorithm disclosed herein may be embodied in a processor-executable software module and may be performed as processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of optimizing inline code generation by a compiler operating on a computing device, comprising:
    selecting a call site detected during a scan of code, comprising:
        detecting a group of call sites during the scan of the code;
        setting a call-site counter equal to a number of call sites in the group of call sites;
        ranking the group of call sites based on a number of nested function calls included in a function called by each of the group of call sites; and
        selecting the call site based on rank, wherein call sites are selected beginning with a lowest rank;
    determining a number of nested function calls included in a called function of the call site;
    determining whether the call site is eligible for inlining based at least on the number of nested function calls included in the called function and the call-site counter indicating a total number of calls to any function currently included within the code; and
    inlining the call site in response to determining that the call site is eligible for inlining.

2. The method of claim 1, wherein the code is bytecode.

3. The method of claim 1, wherein determining whether the call site is eligible for inlining is based only on a sum of the call-site counter and one of the number of nested function calls and a net change in a number of call sites.

4. The method of claim 1, further comprising:
    adding the number of nested function calls to the call-site counter after inlining the call site; and
    adding one to the call-site counter in response to determining that the call site is ineligible for inlining.

5. The method of claim 1, wherein determining whether the call site is eligible for inlining comprises:
    determining whether a sum of the number of nested function calls and the call-site counter exceeds a call-site threshold; and
    determining that the call site is eligible for inlining in response to determining that the sum does not exceed the call-site threshold.

6. The method of claim 1, wherein determining whether the call site is eligible for inlining comprises:
    determining whether the number of nested function calls is greater than one; and
    determining that the call site is eligible for inlining in response to determining that the number of nested function calls is not greater than one.

7. The method of claim 1, wherein determining whether the call site is eligible for inlining is not based on any of whether the call site is on an execution path, a depth of nested function calls in the call site, how often the call site is called, a size of code in which the call site is located, effects of inlining on a size of the code, whether inlining would result in a stack overflow, and effects of inlining on execution time.

8. The method of claim 1, wherein determining whether the call site is eligible for inlining comprises:
   determining whether a sum of a net change in the number of call sites and the call-site counter exceeds a call-site threshold;
   determining that the call site is eligible for inlining in response to determining that the sum does not exceed the call-site threshold; and
   determining that the call site is ineligible for inlining in response to determining that the sum exceeds the call-site threshold.

9. The method of claim 8, further comprising adjusting the call-site counter by the net change in the number of nested function calls after inlining the call site.

10. The method of claim 1, further comprising:
    determining whether each of the group of call sites has been selected;
    selecting an unselected call site in the group of call sites with a next lowest rank in response to determining that each of the group of call sites has not been selected; and
    ending inline optimization in response to determining that each of the group of call sites has been selected.

11. A computing device, comprising:
    a memory; and
    a processor coupled to the memory, wherein the processor is configured with processor-executable instructions to perform operations of an on-device compiler configured to optimize inline code generation, the operations comprising:
       selecting a call site detected during a scan of code, comprising:
          detecting a group of call sites during the scan of the code:
          setting a call-site counter equal to a number of call sites in the group of call sites;
          ranking the group of call sites based on a number of nested function calls included in a function called by each of the group of call sites; and
          selecting the call site based on rank, wherein call sites are selected beginning with a lowest rank;
       determining a number of nested function calls included in a called function of the call site;
       determining whether the call site is eligible for inlining based at least on the number of nested function calls included in the called function and the call-site counter indicating a total number of calls to any function currently included within the code; and
       inlining the call site in response to determining that the call site is eligible for inlining.

12. The computing device of claim 11, wherein the code is bytecode.

13. The computing device of claim 11, wherein the processor is configured with processor-executable instructions to perform operations such that determining whether the call site is eligible for inlining comprises determining whether the call site is eligible for inlining based only on a sum of the call-site counter and one of the number of nested function calls and a net change in a number of call sites.

14. The computing device of claim 11, wherein the processor is configured with processor-executable instructions to perform operations further comprising:
    adding the number of nested function calls to the call-site counter after inlining the call site; and
    adding one to the call-site counter in response to determining that the call site is ineligible for inlining.

15. The computing device of claim 11, wherein the processor is configured with processor-executable instructions to perform operations such that determining whether the call site is eligible for inlining comprises:
    determining whether a sum of the number of nested function calls and the call-site counter exceeds a call-site threshold; and
    determining that the call site is eligible for inlining in response to determining that the sum does not exceed the call-site threshold.

16. The computing device of claim 11, wherein the processor is configured with processor-executable instructions to perform operations such that determining whether the call site is eligible for inlining comprises:
    determining whether the number of nested function calls is greater than one; and
    determining that the call site is eligible for inlining in response to determining that the number of nested function calls is not greater than one.

17. The computing device of claim 11, wherein the processor is configured with processor-executable instructions to perform operations such that determining whether the call site is eligible for inlining comprises determining whether the call site is eligible for inlining not based on any of whether the call site is on an execution path, a depth of nested function calls in the call site, how often the call site is called, a size of code in which the call site is located, effects of inlining on a size of the code, whether inlining would result in a stack overflow, and effects of inlining on execution time.

18. The computing device of claim 11, wherein the processor is configured with processor-executable instructions to perform operations such that determining whether the call site is eligible for inlining comprises:
    determining whether a sum of a net change in the number of call sites and the call-site counter exceeds a call-site threshold;
    determining that the call site is eligible for inlining in response to determining that the sum does not exceed the call-site threshold; and
    determining that the call site is ineligible for inlining in response to determining that the sum exceeds the call-site threshold.

19. The computing device of claim 18, wherein the processor is configured with processor-executable instructions to perform operations further comprising adjusting the call-site counter by the net change in the number of nested function calls after inlining the call site.

20. The computing device of claim 11, wherein the processor is configured with processor-executable instructions to perform operations further comprising:
    determining whether each of the group of call sites has been selected;
    selecting an unselected call site in the group of call sites with a next lowest rank in response to determining that each of the group of call sites has not been selected; and
    ending inline optimization in response to determining that each of the group of call sites has been selected.

21. A computing device, comprising:
    means for selecting a call site detected during a scan of code, comprising:
       means for detecting a group of call sites during the scan of the code;
       means for setting a call-site counter equal to a number of call sites in the group of call sites;

means for ranking the group of call sites based on a number of nested function calls included in a function called by each of the group of call sites; and
means for selecting the call site based on rank, wherein call sites are selected beginning with a lowest rank;
means for determining a number of nested function calls included in a called function of the call site;
means for determining whether the call site is eligible for inlining based at least on the number of nested function calls included in the called function and the call-site counter indicating a total number of calls to any function currently included within the code; and
means for inlining the call site in response to determining that the call site is eligible for inlining.

22. The computing device of claim 21, wherein the code is bytecode.

23. The computing device of claim 21, wherein means for determining whether the call site is eligible for inlining comprises means for determining whether the call site is eligible for inlining based only on a sum of the call-site counter and one of the number of nested function calls and a net change in a number of call sites.

24. The computing device of claim 21, further comprising:
means for adding the number of nested function calls to the call-site counter after inlining the call site; and
means for adding one to the call-site counter in response to determining that the call site is ineligible for inlining.

25. The computing device of claim 21, wherein means for determining whether the call site is eligible for inlining comprises:
means for determining whether a sum of the number of nested function calls and the call-site counter exceeds a call-site threshold; and
means for determining that the call site is eligible for inlining in response to determining that the sum does not exceed the call-site threshold.

26. The computing device of claim 21, wherein means for determining whether the call site is eligible for inlining comprises:
means for determining whether the number of nested function calls is greater than one; and
means for determining that the call site is eligible for inlining in response to determining that the number of nested function calls is not greater than one.

27. The computing device of claim 21, wherein means for determining whether the call site is eligible for inlining comprises means for determining whether the call site is eligible for inlining not based on any of whether the call site is on an execution path, a depth of nested function calls in the call site, how often the call site is called, a size of code in which the call site is located, effects of inlining on a size of the code, whether inlining would result in a stack overflow, and effects of inlining on execution time.

28. The computing device of claim 21, wherein means for determining whether the call site is eligible for inlining comprises:
means for determining whether a sum of a net change in the number of call sites and the call-site counter exceeds a call-site threshold;
means for determining that the call site is eligible for inlining in response to determining that the sum does not exceed the call-site threshold; and
means for determining that the call site is ineligible for inlining in response to determining that the sum exceeds the call-site threshold.

29. The computing device of claim 28, further comprising means for adjusting the call-site counter by the net change in the number of nested function calls after inlining the call site.

30. The computing device of claim 21, further comprising:
means for determining whether each of the group of call sites has been selected;
means for selecting an unselected call site in the group of call sites with a next lowest rank in response to determining that each of the group of call sites has not been selected; and
means for ending inline optimization in response to determining that each of the group of call sites has been selected.

31. A non-transitory processor-readable storage medium having stored thereon processor-executable software instructions configured to cause a processor of a computing device to perform operations of a compiler configured to optimize inline code generation, the operations comprising:
selecting a call site detected during a scan of code, comprising:
detecting a group of call sites during the scan of the code;
setting a call-site counter equal to a number of call sites in the group of call sites;
ranking the group of call sites based on a number of nested function calls included in a function called by each of the group of call sites; and
selecting the call site based on rank, wherein call sites are selected beginning with a lowest rank;
determining a number of nested function calls included in a called function of the call site;
determining whether the call site is eligible for inlining based at least on the number of nested function calls included in the called function and the call-site counter indicating a total number of calls to any function currently included within the code; and
inlining the call site in response to determining that the call site is eligible for inlining.

32. The non-transitory processor-readable storage medium of claim 31, wherein the code is bytecode.

33. The non-transitory processor-readable storage medium of claim 31, wherein the stored processor-executable software instructions are configured to cause the processor of the computing device to perform operations such that determining whether the call site is eligible for inlining comprises determining whether the call site is eligible for inlining based only on a sum of the call-site counter and one of the number of nested function calls and a net change in a number of call sites.

34. The non-transitory processor-readable storage medium of claim 31, wherein the stored processor-executable software instructions are configured to cause the processor of the computing device to perform operations further comprising:
adding the number of nested function calls to the call-site counter after inlining the call site; and
adding one to the call-site counter in response to determining that the call site is ineligible for inlining.

35. The non-transitory processor-readable storage medium of claim 31, wherein the stored processor-executable software instructions are configured to cause the processor of the computing device to perform operations such that determining whether the call site is eligible for inlining comprises:
determining whether a sum of the number of nested function calls and the call-site counter exceeds a call-site threshold; and
determining that the call site is eligible for inlining in response to determining that the sum does not exceed the call-site threshold.

36. The non-transitory processor-readable storage medium of claim 31, wherein the stored processor-executable software instructions are configured to cause the processor of the computing device to perform operations such that determining whether the call site is eligible for inlining comprises:
- determining whether the number of nested function calls is greater than one; and
- determining that the call site is eligible for inlining in response to determining that the number of nested function calls is not greater than one.

37. The non-transitory processor-readable storage medium of claim 31, wherein the stored processor-executable software instructions are configured to cause the processor of the computing device to perform operations such that determining whether the call site is eligible for inlining comprises determining whether the call site is eligible for inlining not based on any of whether the call site is on an execution path, a depth of nested function calls in the call site, how often the call site is called, a size of code in which the call site is located, effects of inlining on a size of the code, whether inlining would result in a stack overflow, and effects of inlining on execution time.

38. The non-transitory processor-readable storage medium of claim 31, wherein the stored processor-executable software instructions are configured to cause the processor of the computing device to perform operations such that determining whether the call site is eligible for inlining comprises:
- determining whether a sum of a net change in the number of call sites and the call-site counter exceeds a call-site threshold;
- determining that the call site is eligible for inlining in response to determining that the sum does not exceed the call-site threshold; and
- determining that the call site is ineligible for inlining in response to determining that the sum exceeds the call-site threshold.

39. The non-transitory processor-readable storage medium of claim 38, wherein the stored processor-executable software instructions are configured to cause the processor of the computing device to perform operations further comprising adjusting the call-site counter by the net change in the number of nested function calls after inlining the call site.

40. The non-transitory processor-readable storage medium of claim 31, wherein the stored processor-executable software instructions are configured to cause the processor of the computing device to perform operations further comprising:
- determining whether each of the group of call sites has been selected;
- selecting an unselected call site in the group of call sites with a next lowest rank in response to determining that each of the group of call sites has not been selected; and
- ending inline optimization in response to determining that each of the group of call sites has been selected.

* * * * *